US009338447B1

(12) United States Patent
Crump et al.

(10) Patent No.: US 9,338,447 B1
(45) Date of Patent: May 10, 2016

(54) CALIBRATING DEVICES BY SELECTING IMAGES HAVING A TARGET HAVING FIDUCIAL FEATURES (75) Inventors: Edward Dietz Crump, Santa Cruz, CA (US); Manika Puri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/419,750

(22) Filed: Mar. 14, 2012

(51) Int. Cl.
H04N 17/02 (2006.01)

(52) U.S. Cl.
CPC .................................. *H04N 17/02* (2013.01)

(58) Field of Classification Search
CPC .............................. H04N 17/00; H04N 17/002
USPC .................. 348/180, 181, 187, 188, 189, 190
See application file for complete search history.

(56) References Cited

U.S. PATENT DOCUMENTS

| 6,437,823 | B1 * | 8/2002 | Zhang | H04N 17/002 348/187 |
| 6,970,591 | B1 * | 11/2005 | Lyons | G06K 9/209 345/419 |
| 6,975,334 | B1 * | 12/2005 | Barrus | G06T 15/04 345/582 |
| 7,570,881 | B2 * | 8/2009 | Perala et al. | 396/182 |
| 8,106,949 | B2 * | 1/2012 | Tan | H04N 9/3185 348/177 |
| 8,150,143 | B2 * | 4/2012 | Chen et al. | 382/154 |
| 8,665,334 | B2 * | 3/2014 | Williams | 348/188 |
| 2003/0063292 | A1 * | 4/2003 | Mostafavi | A61B 6/463 356/614 |
| 2003/0076980 | A1 * | 4/2003 | Zhang et al. | 382/103 |
| 2003/0142882 | A1 * | 7/2003 | Beged-Dov | G06K 9/3216 382/284 |
| 2003/0182072 | A1 * | 9/2003 | Satoh et al. | 702/95 |
| 2004/0066454 | A1 * | 4/2004 | Otani et al. | 348/188 |
| 2008/0285854 | A1 * | 11/2008 | Kotake et al. | 382/190 |
| 2008/0292131 | A1 * | 11/2008 | Takemoto et al. | 382/100 |
| 2009/0091623 | A1 * | 4/2009 | Krogstad | 348/189 |
| 2009/0180008 | A1 * | 7/2009 | Williams | G06T 7/0018 348/241 |
| 2009/0208063 | A1 * | 8/2009 | Chen et al. | 382/107 |
| 2010/0045701 | A1 * | 2/2010 | Scott | G01S 5/163 345/633 |
| 2010/0111370 | A1 * | 5/2010 | Black | G06K 9/00369 382/111 |
| 2010/0201809 | A1 * | 8/2010 | Oyama et al. | 348/135 |
| 2010/0245593 | A1 * | 9/2010 | Kim et al. | 348/188 |
| 2010/0259622 | A1 * | 10/2010 | Steinberg et al. | 348/187 |
| 2010/0259624 | A1 * | 10/2010 | Li et al. | 348/187 |
| 2011/0063295 | A1 * | 3/2011 | Kuo | G06T 15/50 345/426 |
| 2011/0090343 | A1 * | 4/2011 | Alt et al. | 348/164 |
| 2011/0228104 | A1 * | 9/2011 | Nelson | H04N 9/3147 348/190 |
| 2011/0262032 | A1 * | 10/2011 | Gu | 382/154 |
| 2011/0285858 | A1 * | 11/2011 | Chen et al. | 348/187 |
| 2012/0154638 | A1 * | 6/2012 | Chou | G06T 19/006 348/239 |
| 2012/0223885 | A1 | 9/2012 | Perez | |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Jefferey Harold
*Assistant Examiner* — Humam Satti
(74) *Attorney, Agent, or Firm* — Lee & Hayes, PLLC (57) ABSTRACT

Devices and techniques are described for automatically calibrating a device such as a camera, projector, or both using a video stream. The device undergoing calibration is coupled to a computing device and configured to acquire video comprising a plurality of images. These images, at least some of the time, include targets having known characteristics present in an environment. From these acquired images calibration data comprising parameters such as intrinsic parameters, extrinsic parameters, or both, may be determined. The calibration data may be embedded or otherwise associated with the video stream as calibration matrix metadata.

20 Claims, 8 Drawing Sheets

CALIBRATING DEVICES BY SELECTING IMAGES HAVING A TARGET HAVING FIDUCIAL FEATURES

BACKGROUND

Cameras, projectors, and other devices are used for a variety of applications, including human-machine interfaces, augmented reality environments, remote sensing, gaming, metrology, and so forth. These applications may benefit from calibrating the device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Images acquired by cameras or projected by image projectors are used in a variety of environments. Calibrating these cameras and/or projectors may prove useful in order to increase the precision and accuracy of these devices. As described below, camera and projector calibration allows for determination of calibration data, such as intrinsic parameters and extrinsic parameters. The intrinsic parameters include, but are not limited to, focal point, principal point, skew coefficients, and so forth. The extrinsic parameters include, but are not limited to, target distance, relative angles between a camera or a projector and a target, and so forth. Once the parameters are determined, adjustments or compensation may be made to account for these parameters, which improves overall accuracy of acquired images in the case of a camera or a projected image in the case of the projector.

Disclosed herein are systems and techniques for calibrating a device, such as a camera or projector, using a video (e.g., a video stream). These systems and techniques enable calibration that is free from human intervention, minimizes or eliminates potential for human error, reduces calibration time, improves calibration accuracy, allows ongoing calibration, and so forth. For example, a camera and projector may use the techniques described herein for periodic or continuous calibration.

These techniques may be applied to video streams during capture (e.g., in real-time) or to video streams that have been previously captured and stored. For example, a previously acquired video stream within an environment that includes targets and that has been stored using a lossless compression technique may be used to generate calibration matrix metadata after the acquisition.

A video stream comprises a plurality of images or frames of an environment, with the environment including one or more targets. These targets may include dedicated targets, embedded targets, or objects with previously determined characteristics which may be used as targets. Characteristics of these targets are known to and may be used by a calibration module to calibrate the device.

The camera may be undergoing calibration or the acquired video stream may include a portion of a projected image generated by a projector to allow for calibration of the projector. In some implementations the camera and the projector may both undergo calibration contemporaneously. A relative change in position, orientation, or both between the camera, the projector, and the target produces a change in the plurality of images in the video stream. A particular combination of orientation, position, and so forth is termed a "pose." For example, a camera or projector may pan, tilt, or rotate, and so forth from a first position to a second position. The pose may also comprise a position of an object such as a target within the environment. For example, a target may be moved in the environment or the user may move, revealing a target to the camera.

A computing device accesses the video stream and identifies one or more targets in the plurality of images which make up the video stream. Features such as one or more fiducial markers (or "fiducials") are identified in at least a portion of the plurality of images. These fiducials may form a pattern, such as a checkerboard. Characteristics of the fiducials may be pre-determined. These characteristics may include arrangement, size, color, and so forth.

An observed location of the target and particular points, such as the fiducials, is obtained from the acquired images. Features of the fiducials such as corners, edges, and so forth may be extracted. Based on prior knowledge of the fiducials, their spatial arrangement, and at least a portion of the extracted features, one or more calculated locations may be generated. For example, corners of the checkerboard may be recognized. From these corners and a count of the number of squares in the checkerboard, calculated locations of intersections between squares may be determined.

Intrinsic and extrinsic device parameters may then be generated based on a comparison of the observed locations to the calculated locations. The calculated locations are outputs of a function of these parameters. The intrinsic parameters may include a focal point, principal point, skew coefficient(s), distortion coefficient(s), and so forth. Extrinsic parameters may include target distance, relative angles between the camera and the target, and so forth.

Using the outputs of the function of the intrinsic and extrinsic parameters, a re-projection error may be calculated. The re-projection error expresses the variance between the observed location and the calculated location. For example, for a given corner of the checkerboard in the camera image, a corresponding three-dimensional (3D) location of the corner may be calculated using estimated parameters. The estimated 3D location is then compared with the 3D position of the corresponding physical checkerboard corner. Then, a re-projection error may be defined, such as determining that the observed location is +0.5 pixels along an x-axis and −0.3 pixels along a y-axis of the checkerboard.

By utilizing the variety of different poses resulting from relative movements between the camera and targets over time, images are acquired for use in multiple iterations. By iterating through the calibration process, accuracy may be improved such the re-projection error in some implementations may attain sub-pixel accuracy. Said another way, by iterating, the calibration may be refined such that the observed location and the calculated locations converge. Over time, for a particular set of poses which are relatively close to one another, the calibration data generated will converge. When a series of poses diverge significantly from one another, such as during a change in the camera point-of-view resulting from a 90 degree pan to the left by the camera, the calibration process may begin again using the video stream.

The resulting calibration data may be stored and used to calibrate the device, improving the accuracy of images acquired by the camera or projected by the projector using image distortion correction. Images acquired or projected by the calibrated device may thus be used for high-precision applications such as in an augmented reality environment, remote sensing, metrology, quality assurance, and so forth.

Illustrative Environment

Figure 1:
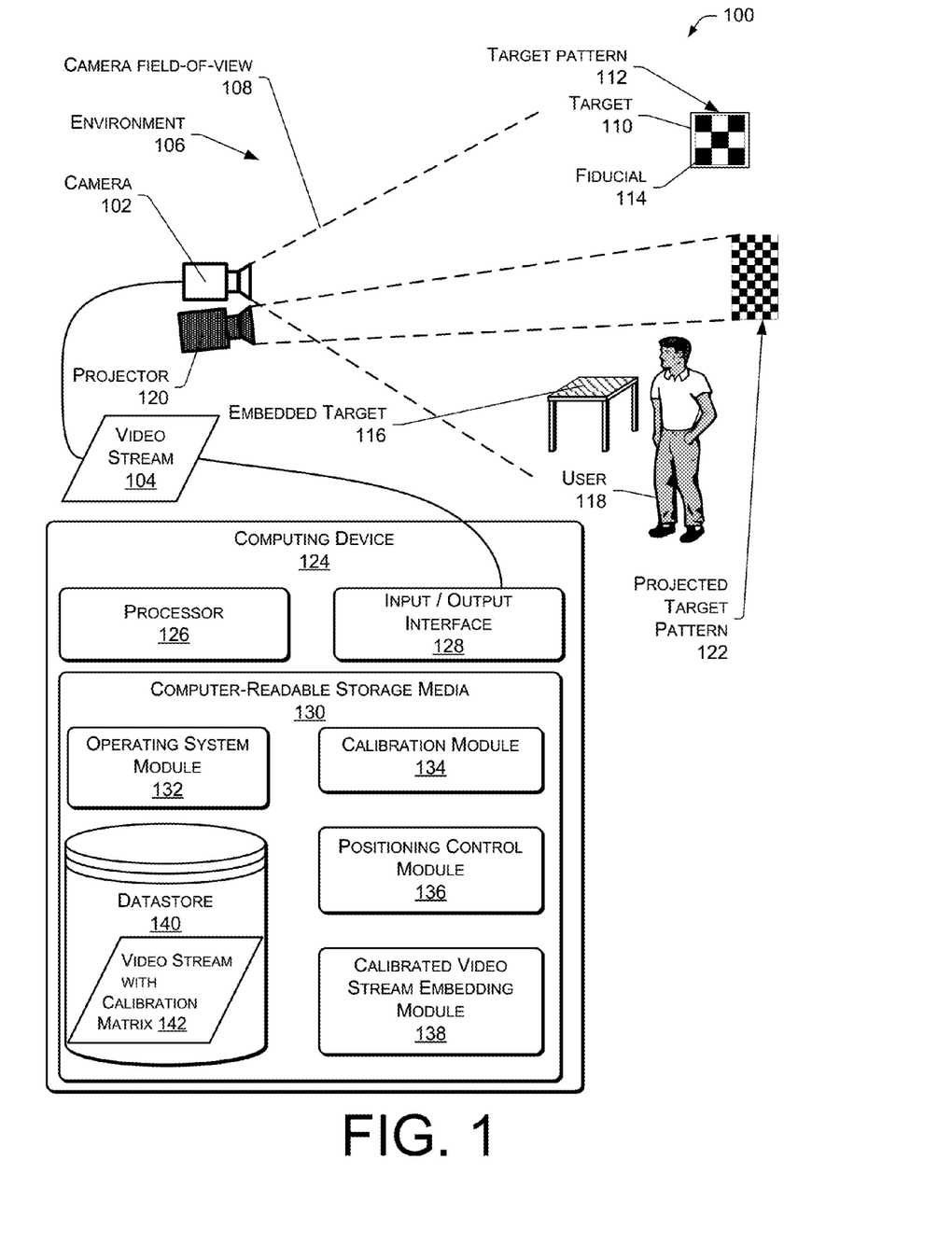
FIG. 1 shows an illustrative automated calibration system using a video stream.

FIG. 1 shows an illustrative automated calibration system 100 that includes a device undergoing calibration. Within the illustrated environment, a camera 102 is configured to generate images from visible light, non-visible light, or both. For example, in one implementation the camera 102 may be configured to generate a thermal image as well as a visible light image. The camera 102 comprises an imaging element such a charge-coupled device (CCD), complementary metal-oxide semiconductor (CMOS), microbolometer array, and so forth. The camera 102 also comprises one or more optical elements such as lenses, prisms, mirrors, and so forth. The camera 102 captures a video stream 104 of at least a portion of an environment 106. The video stream 104 comprises a plurality of images, such as frames, acquired over time.

The camera 102 has a camera field-of-view 108 which describes a particular solid angle originating at a particular point-of-view. The camera field-of-view 108 may vary according to changes in the configuration of the camera 102. For example, an optical zoom of the camera may narrow the camera field-of-view 108.

A target distance separates the camera 102 from a target 110. The target distance may be measured between a designated point relative to the camera 102 and a designated point relative to the target 110. For example, the target distance may represent the distance from a front edge of the camera 102 to the center of the target 110.

The target 110 comprises a substrate and one or more structural elements configured to present a target pattern 112 in a repeatable fashion. The target 110 may comprise the target pattern 112, or may act as a projection screen to receive a projection of the target pattern 112 from a projector. In some implementations the target 110 may comprise glass, metal, plastic, paper, and so forth. Furthermore, the target 110 may be placed at a distance such that the entire target pattern 112 is within the camera field-of-view 108.

The target pattern 112 is configured to be visualized by the camera 102. For example, where the camera 102 operates in infrared wavelengths, the target pattern 112 is configured to provide an image in those infrared wavelengths. The target pattern 112 comprises one or more fiducials arranged in a known configuration. For example, a checkerboard target pattern 112 comprising alternating white and dark squares is shown here, although other implementations may use other patterns. The squares may be of one or more sizes including but not limited to 20, 30 or 50 millimeters on each side. The target pattern 112 may include different size squares. For example, one section of the target pattern 112 may comprise 20 mm squares while a second section comprises 30 mm squares.

Regardless of the specific pattern used, these patterns may be produced using a photolithographic process. The target pattern 112 comprises one or more fiducials 114 that provide reference points in the target pattern 112. The target pattern 112 may be planar or comprise non-planar surface features.

In some implementations embedded targets 116 may be present within the environment 106. The embedded target 116 is a target which is integrated with or integral to an object which has some other purpose, either functional or decorative. For example, the embedded target 116 may comprise a pattern visible in the infrared which is present on a tabletop. In another implementation, the embedded target 116 may comprise an electrical outlet or light switch cover plate of pre-determined shape and size. The embedded target 116 may be an object which appears to be an object having a decorative use, such as a sculpture or flower vase of a pre-determined shape and size. A user 118 in the environment 106 may thus interact with or be in the midst of one or more embedded targets 116 which provide fiducials for calibration, but are unobtrusive.

In some implementations the system may also comprise a projector 120 configured to project images onto surfaces in the environment 106. As with the camera 102, it may be desirable to calibrate output from the projector 120. The images projected by the projector may be visible light images perceptible to the user, visible light images imperceptible to the user, images with non-visible light, or a combination thereof. The projector 120 also comprises one or more optical elements such as lenses, prisms, mirrors, and so forth. In some implementations the camera 102 and the projector 120 may share a common chassis.

The projector 120 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 120 has a projector field-of-view which describes a particular solid angle. The projector field-of-view may vary according to changes in the configuration of the projector. For example, the projector field-of-view may narrow upon application of an optical zoom to the projector 120.

The projector 120 may be configured to project a projected target pattern 122. This projected target pattern 122 may be presented on at least a portion of the target 110 or on other surfaces within the environment 106 such as walls, floors, ceiling, furniture, and so forth. The projected target pattern 122 is configured to be visualized by the camera 102 after interacting with one or more objects in the environment 106, such as at least a portion of the target 110. For example, where the projector 120 operates in infrared wavelengths, the camera 102 may be configured to acquire images in those infrared wavelengths.

In some implementations a plurality of projected target patterns 122 may be used. For example, a first image may be acquired by the camera 102 when a first projected target pattern 122(1) is projected on the target 110, a second image may be acquired of a second projected target pattern 122(2), and so forth.

The projected target pattern 122 comprises one or more fiducials arranged in a known configuration. These fiducials provide reference points in the projected target pattern 122 which may be used to calibrate the camera, projector, or both. For example, a checkerboard projected target pattern 122 comprising alternating white and dark squares is shown here. As above, with regards to the target 112, the projected target pattern 122 may include different size squares. In other implementations, other patterns may be used.

The camera 102, the projector 120, or both may have shared or independent positioning mechanisms. These mechanisms are configured to move the camera 102, the projector 120, or both in one or more degrees of freedom relative to a fixed point in the environment 106, such as a wall. These degrees of freedom may include but are not limited to roll, pitch, yaw, heave, sway, surge, or a combination thereof. The positioning mechanism may comprise one or more linear actuators, rotary actuators, motors, electroactive polymers, piezoelectric actuators, and so forth. In some implementations, the positioning mechanism may facilitate linear motion in the environment 106, such as between the target 110 and the camera 102.

By moving the camera 102, the projector 120, or both, relative to the environment 106, different poses may be generated. These different poses provide distinct views of the environment. For example, a change in optical zoom, and pan and tilt to track the user 118 moving through the environment 106 results in a series of different poses. The targets 110, the embedded targets 116, and the projected target patterns 122 as imaged in the video stream 104 may thus be used to generate calibration data from these different poses.

An illuminator (not shown) may be used to provide known or controlled illumination of the environment 106 during acquisition of images by the camera 102. The illuminator may comprise an incandescent, fluorescent, or solid-state device configured to provide illumination compatible with the target pattern 112 and the camera 102. The illuminator may be configured to provide one or more illumination levels to the target 110.

A computing device 124 comprising a processor 126, an input/output interface 128, and computer-readable storage media (CRSM) 130 is shown. The processor 126 may comprise one or more processors configured to execute instructions. The instructions may be stored in the CRSM 130, or in other CRSM or memory accessible to the processor 126.

The input/output interface 128 may be configured to couple the computing device 124 to other components including the camera 102, the projector 120, user interface devices, and so forth. The input/output interface 128 may be configured to couple to other devices outside the environment, such as cloud servers via a network interface.

The CRSM 130 may be any available physical media accessible by a computing device to implement the instructions stored thereon or store data within. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 130 and configured to execute on a processor, such as the processor 126. Modules may also be stored in storage devices accessible on a local network, cloud storage accessible via a wide area network, or distributed across a combination thereof. An operating system module 132 is configured to manage hardware and services within and coupled to the computing device 124 for the benefit of other modules.

A calibration module 134 is configured to generate from the video stream 104 calibration data for the camera 102, the projector 120, or both. This calibration data may include intrinsic parameters as well as extrinsic parameters. That is, the calibration data may be used to adjust or otherwise set one or more extrinsic and/or intrinsic parameters of the camera 102, the projector 120, or both. This calibration data is based at least in part on plurality of images, or frames, in the video stream 104 of the target 110, the embedded target 116, the projected target pattern 122, and so forth as acquired from the camera 102 in different poses. The different poses result from the movement of the camera 102, the projector 120, or both by the positioning mechanism under the control of a positioning control module 136.

The positioning control module 136 is configured to direct actuators coupled to the positioning mechanism in order to move the camera 102, the projector 120, or both. The actuators may be configured to provide positioning feedback, allowing for precision determination of the relative position of the physical structures. For example, one or more linear actuators of the positioning mechanism may be configured with linear encoders allowing for feedback as to actual displacement of the actuator after a command to displace the actuator from the positioning control module 136 has been performed. In some implementations, this feedback may be used at least in part to generate the calibration data.

A calibrated video stream embedding module 138 is configured to associate calibration data generated at least in part by the calibration module 134 with the video stream 104. As described below in more detail with regards to FIG. 5, calibration matrix metadata may be generated which comprises calibration data such as intrinsic parameters, extrinsic parameters, and so forth. In some implementations, this calibration matrix metadata may be embedded into the video stream such as within frame headers.

Data associated with operation of the computing device 124 may be stored within a datastore 140. The datastore 140 may be stored on one or more of the CRSM 130, storage devices accessible on the local network, cloud storage accessible via a wide area network, or distributed across one or more of these. For example, as mentioned above the calibration data may be associated with the video stream 104 to generate a video stream with calibration matrix 142 which may be stored in the datastore 140. To preserve fine detail which may be used during calibration, the video stream may be stored in the datastore 140 using lossless compression techniques.

Figure 2:
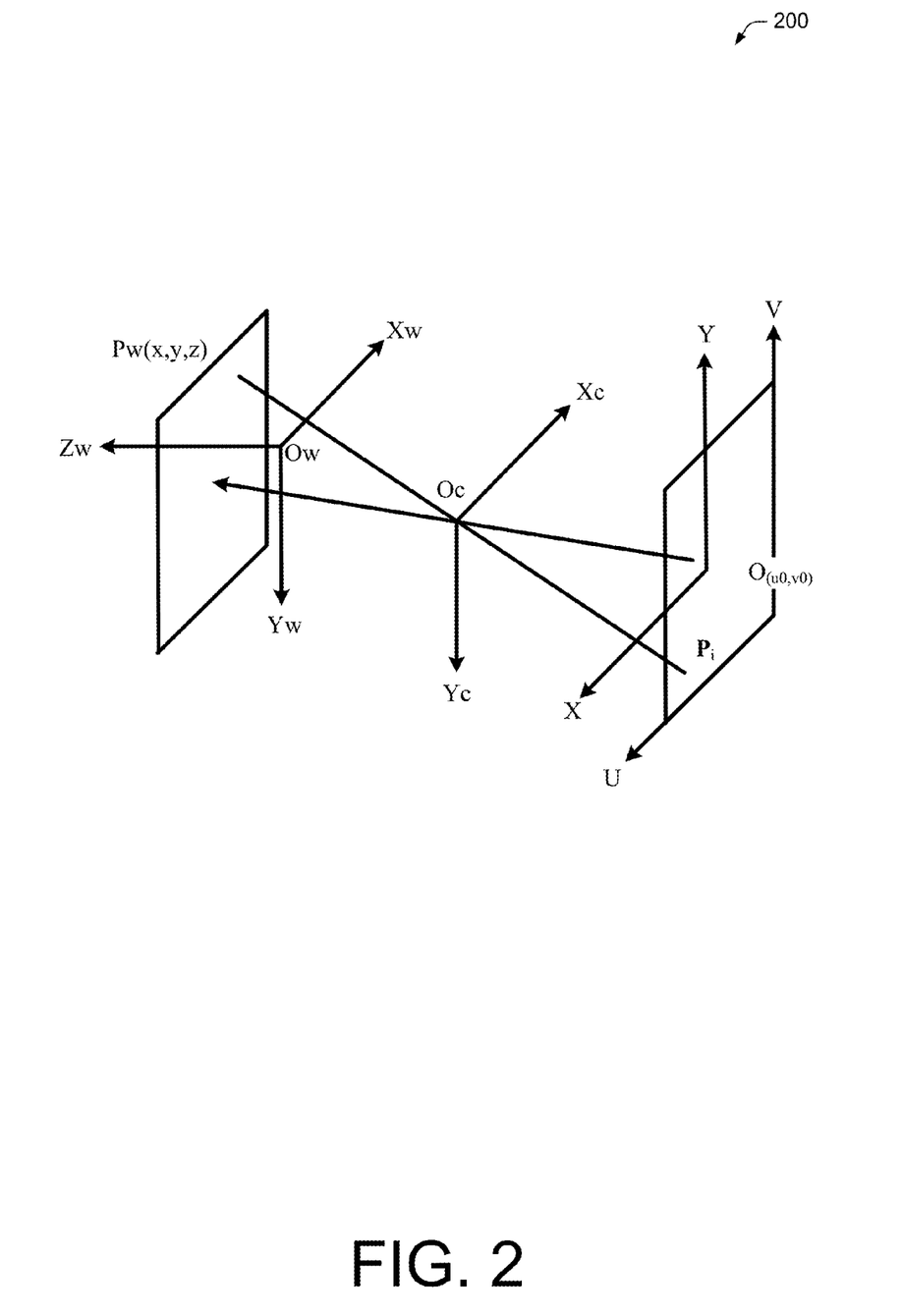
FIG. 2 illustrates camera-related coordinate relationships.

FIG. 2 illustrates camera- and projector-related coordinate relationships 200 as discussed herein. The following discussion, while describing cameras is also applicable to projectors. In this illustration, Pw (x,y,z) represents the coordinate of a measured point with respect to the world coordinate in object space, Pc(xc, yc, zc) represents the corresponding coordinate of P in camera coordinate system, and Pi(u,v) represents the image point P with respect to an image coordinate O.

The camera 102 has intrinsic parameters and extrinsic parameters. The intrinsic parameters are those internal to the optical system of the camera 102. The extrinsic parameters are those which relate to factors external to the camera 102 optical system, such as overall direction of the camera relative to a reference point in the environment. Individual intrinsic parameters are discussed in more detail below with regards to FIG. 3 while extrinsic parameters are discussed in more detail below with regards to FIG. 4.

The intrinsic and extrinsic parameters and their relations are shown as follows:

$$z_c \begin{bmatrix} u \\ v \\ 1 \end{bmatrix} = \begin{bmatrix} a_x & s & u_0 \\ 0 & a_y & v_0 \\ 0 & 0 & 1 \end{bmatrix} * \begin{bmatrix} R & t \\ o_3^T & 1 \end{bmatrix} *$$ (Equation 1)

$$\begin{bmatrix} x_w \\ y_w \\ z_w \\ 1 \end{bmatrix} = \begin{bmatrix} m_1 & m_2 & m_3 & m_4 \\ m_5 & m_6 & m_7 & m_8 \\ m_9 & m_{10} & m_{11} & m_{12} \end{bmatrix} * \begin{bmatrix} x_w \\ y_w \\ z_w \\ 1 \end{bmatrix}$$

Where $m_1$ to $m_{12}$ represent twelve unknown camera parameters and $a_x$, $a_y$, s, $u_0$, $v_0$, R, and t are the parameters the calibration system 100 determines. As described above, the parameters comprise of intrinsic parameters $a_x$, $a_y$, s, $u_0$, $v_0$ and extrinsic parameters R and t. The intrinsic and extrinsic parameters may be solved for once $m_1$ to $m_{11}$ are known.

As used herein, $a_x$ is a ratio of the focal length and the unit pixel dimension with respect to the x-axis. Similarly ay is a ratio with respect to the y-axis, s is the skew, and u0, v0 are the pixel plane center coordinates. R is the rotation metric and t is the translation vector. Herein, $a_x$ is the focal length over the unit pixel dimension with respect to x-axis and $a_y$ with respect to y-axis, s is skew, and $u_0$, $v_0$ are pixel plane center coordinates. R is the rotation metric and t is the translation vector. A projector may be considered the inverse of a camera, therefore the same parameters used for a camera can be considered for projector parameters.

Figure 3:
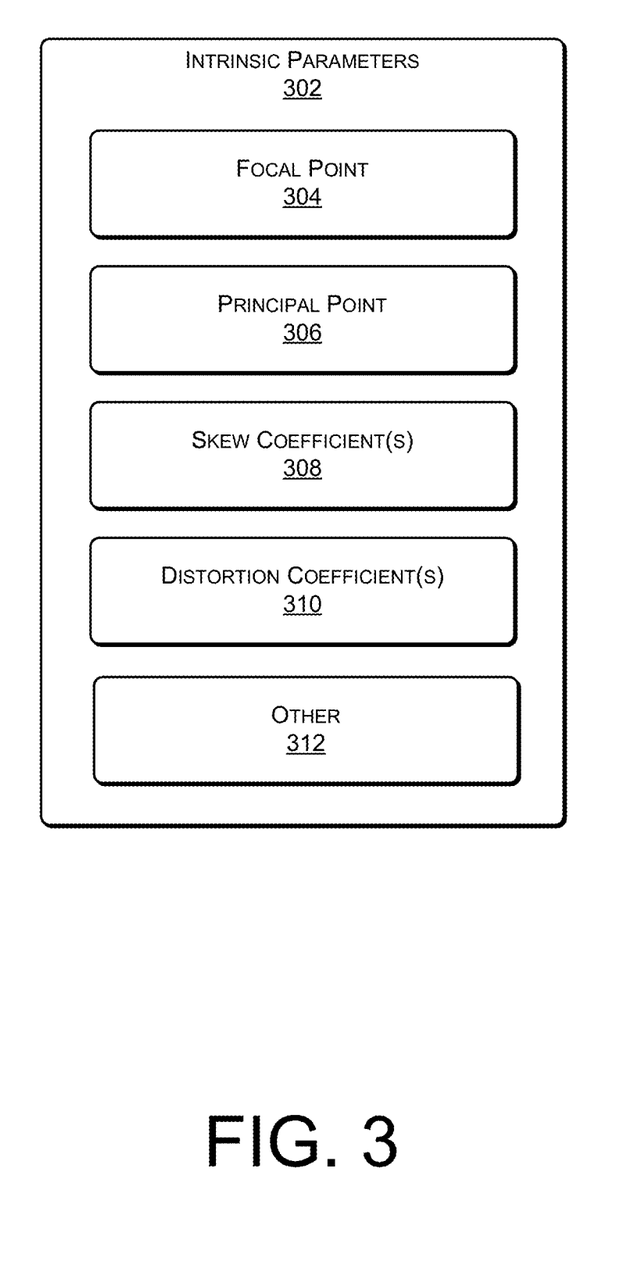
FIG. 3 illustrates intrinsic parameters which may be determined by the automated calibration system.

FIG. 3 illustrates intrinsic parameters 302 which may be determined or altered by the automated calibration system 100. A focal point 304 of the system may be determined in some instances. For example, in the camera 102 the focal point 304 is a point relative to optical elements at which collimated light is parallel to the axis of the optical system. A focal length is a distance from a principal plane of a lens or mirror to the focus.

A principal point 306 may also be determined using the automated calibration system 100. The principal point 306 is a point at which a principal plane crosses an optical axis. Other intrinsic parameters include one or more skew coefficients 308 and distortion coefficients 310. The skew coefficients 308 define an angle between x and y pixel axes. The distortion coefficients 310 describe radial, tangential, or radial and tangential variations. In other implementations other 312 intrinsic parameters may also be determined.

Figure 4:
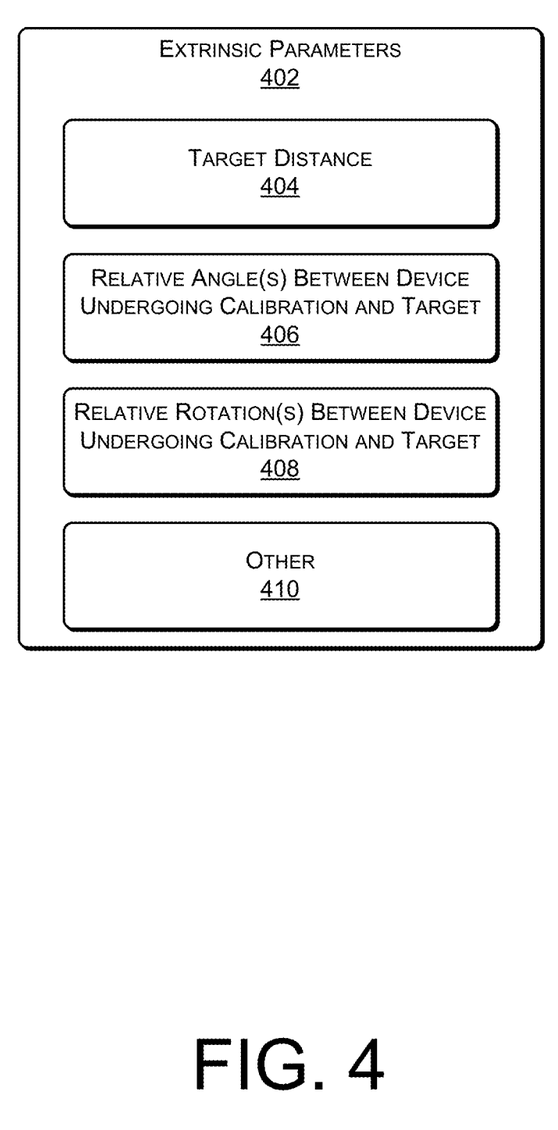
FIG. 4 illustrates extrinsic parameters which may be determined by the automated calibration system.

FIG. 4 illustrates extrinsic parameters 402 which may be determined by the automated calibration system 100. The extrinsic camera parameters 404 describe the overall system in relation to the outside environment. As shown here, these parameters may include a target distance 404, which is a distance between the device undergoing calibration and the target such as the target 110, the embedded target 116, the projected target pattern 122, or a combination thereof. One or more relative angles between the device undergoing calibration and the target 110 may also be defined. A relative rotation 408 between the camera 102 and the target may be considered as well. In other implementations, other 410 extrinsic camera parameters may be determined.

Figure 5:
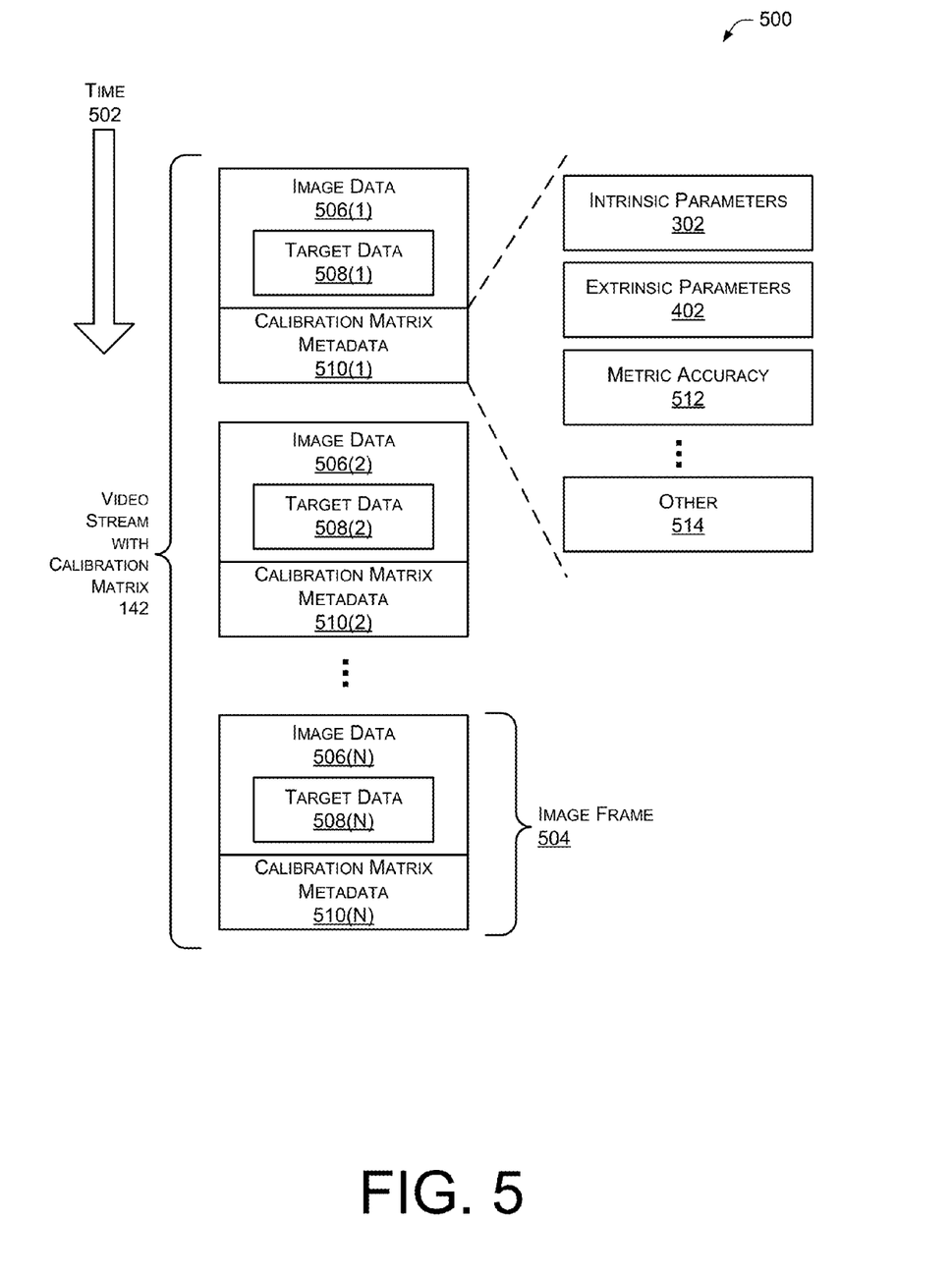
FIG. 5 illustrates a portion of a video stream with associated calibration matrix metadata.

FIG. 5 illustrates a portion 500 of a video stream with associated calibration matrix metadata. Illustrated here is a video stream with calibration matrix 142 with time 502 increasing as indicated by an arrow for a series of image frames 504. The stream 142 comprises a plurality of images, and each of these images may be encoded within an image frame 504.

Image data 506(1), (2), . . . , (N) comprises data describing an image of the environment as acquired by the camera 102 or to be projected by the projector 120. The image data 506(1)-(N), such as from the camera 102, may also comprise, respective pieces of target data 508(1), (2), . . . , (N). The target data 506 is the portion of the image which represents at least a portion of the targets and fiducials in the environment 106 as imaged by the camera 102. In the case of the projector 120, each piece of target data 506 may comprise a bitmap of a fiducial to be projected.

As described above, the calibration module 134 may be configured to use the data about the targets and fiducials within the stream to generate calibration data. This calibration data may be used to form the calibration matrix metadata 510(1), (2), . . . , (N). Associated with the image data 506(1)-(N) is respective calibration matrix metadata 510(1)-(N). The calibration matrix metadata 510 may be associated with each frame 504, or with a set of frames. This association may be a time index, counter, byte count, or the calibration matrix metadata 510 may be embedded within the video stream itself, such as within headers of the image frame 504. In one implementation the calibration matrix metadata 510 may be stored in a data file separate from the video stream.

The calibration matrix metadata 510 represents at least a portion of the calibration data associated with a particular image frame 504, or a subset of image frames 504. The calibration matrix metadata 510 may include some or all of the intrinsic parameters 302, the extrinsic parameters 402, an accuracy metric 512, and other data 514 pertaining to the system state which may be useful.

The accuracy metric 512 is used to indicate calibration state for a related set of poses. For example, where the camera 102 pans such that a particular target remains within the acquired video stream, ongoing calibration may result in calibration which approaches a convergence point, expressed as the rolling convergence accuracy metric. Upon a dramatic change between poses, such as the camera 102 panning or tilting away from the particular target, a new set of calibration matrices may be initialized and used for subsequent calibration.

Other data 514 may also be stored and may include other factors such as time of day, ambient lighting levels, position and movement of light sources such as the sun, state of other devices in the environment such as window shades being open or closed, and so forth. For example, the calibration matrix metadata 510 may incorporate data involving ambient light levels and the time of day when the sun shines through a particular window, resulting in changes to the calibration matrix. Thus, in the future at particular times when those same or similar conditions exist, the system may access from the datastore 140 a previously store calibration state.

Because the calibration matrix metadata 510 comprises the calibration data, lossy compression techniques may be used on the video stream once the calibration data has been generated. For example, in some implementations, the image data 506 may be formatted in compliance with the Motion Picture Experts Group 4 (MPEG4) format. This may be done to minimize bandwidth requirements during transmission, minimize storage requirements, and so forth.

Figure 6:
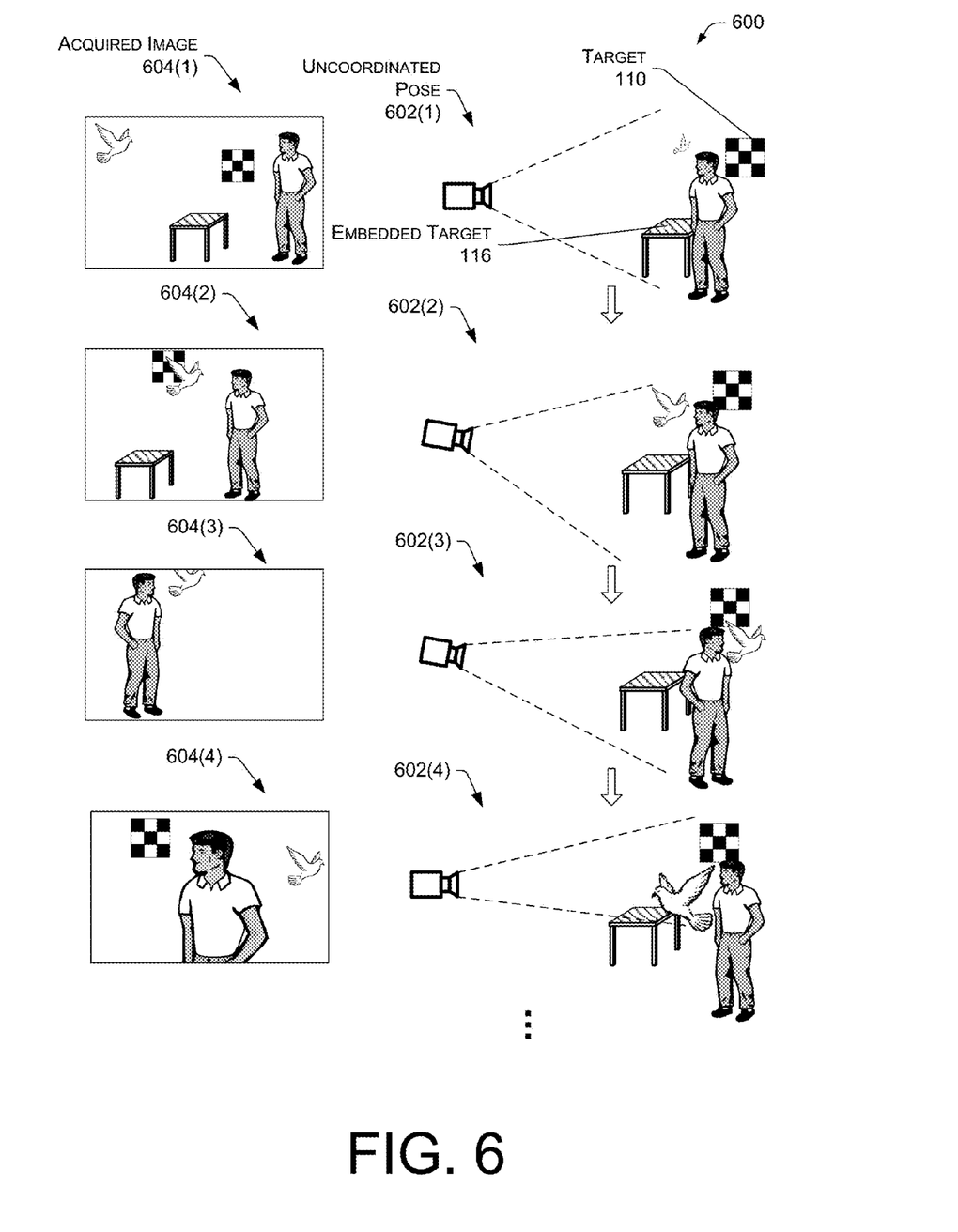
FIG. 6 illustrates a series of acquired images of a calibration target in different poses relative to the camera.

FIG. 6 illustrates a series 600 of acquired images of a calibration target in different poses relative to the camera. A series of poses 602(1)-(4) are shown, as well as corresponding acquired images 604(1)-(4) as received from the camera 102. In this illustration, a bird is shown flying from left to right in the environment 106 while the user 118 turns to watch.

Due to movement of the camera 102 by the positioning mechanism or other changes in the pose, the camera 102 acquires the video stream 104 with a plurality of images in different poses. For example, as shown here, while in the pose 602(1) the camera 102 may acquire the video stream while facing the user and at a particular zoom level.

Due to the change in orientation, zoom, and so forth of the camera 102, the pose changes. The video stream thus includes pluralities of images in different poses. The fiducials of the targets in the environment 106 may thus be used to generate calibration data based at least in part on these different poses, solving Equation 1 as described above.

As illustrated here, the camera 102 has panned and tilted relative to pose 602(1) to form pose 602(2). Pose 602(3) demonstrates a change in zoom level, such as may occur when the camera 102 has been zoomed to allow for higher resolution data of the user's 118 face. In some situations, targets may not be present. For example, as shown here poses 602(1), (2), and (4) with their corresponding acquired images 604(1), (2), and (4) include targets such as the target 110 or the embedded target 116. However, pose 602(3) and corresponding image 604(3) do not have a calibration pattern present. In some implementations, generation of calibration data for the video stream 104 may be suspended when no target is present in the acquired image. In another implementation, a last determined calibration may be used until a target is identified.

Based on the pose and the images acquired, the calibration module 134 is configured to generate calibration data for use in calibrating the camera 102, the projector 120, or both. The process of generating the calibration data is described next with regard to FIG. 7.

The ongoing calibration afforded by acquiring calibrated data from the video stream 104 may improve overall accuracy of the camera 102, the projector 120, and so forth during operation. For example, in an augmented reality environment where the camera 102, the projector 102, or both are configured to move, vary their zoom levels, and so forth, over time movements of the devices may introduce changes into the optical path. These changes, if left un-calibrated, may result in the accrual of undesirable errors. By calibrating one or both of these devices using the video stream without the need for a dedicated calibration procedure, accuracy is improved, user intervention is reduced, and overall system performance realizes a significant benefit in improved accuracy.

Illustrative Processes

The processes described in this disclosure may be implemented by the devices described herein, or by other devices. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other devices as well.

Figure 7:
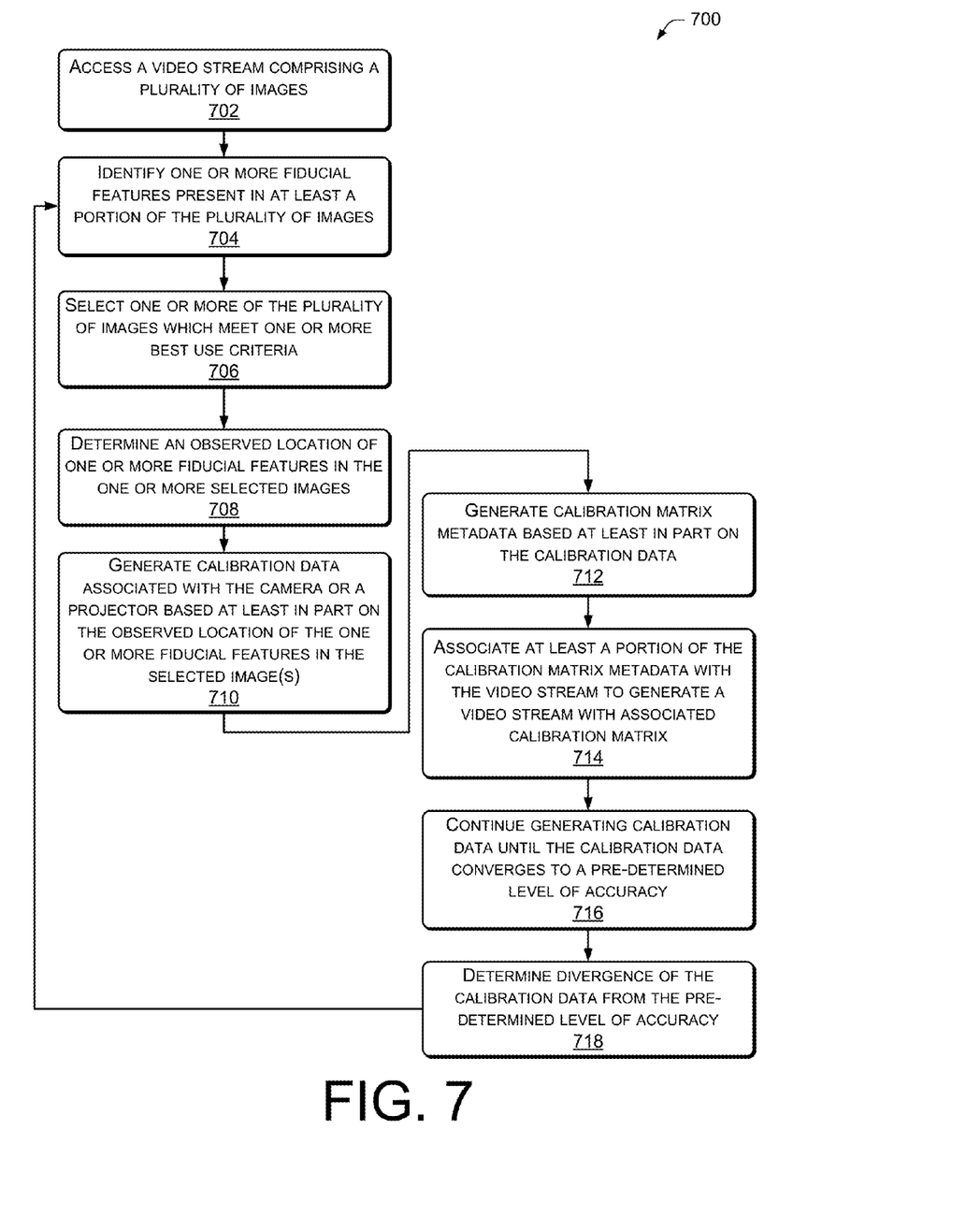
FIG. 7 is a process of calibrating a camera or projector system and associated video stream.

At 702, a video stream 104 comprising a plurality of images is accessed. For example, this may be a video stream 104 generated by the camera 102 contemporaneously or may be a video stream retrieved from the datastore 140. When stored in the datastore 140, the video stream 104 may be stored using a lossless format which preserves fine image details.

At 704, one or more fiducial features present in at least a portion of the plurality of images are identified. For example, the squares in the target pattern 112, the embedded target 116, or the projected target pattern 122 are identified. In some implementations each of the plurality of images may be inspected for the one or more fiducial features.

At 706, one or more of the plurality of images which meet one or more best use criteria are selected. These best use criteria may include focus, best fit of lines through the grid pattern, contrast, image noise, clearest image, whether the entire target pattern 112 or projected target pattern 122 is present within the acquired image, presence of reflections, and so forth. For example, an image in which the target pattern 112 is out of focus may be discarded or not selected.

At 708, an observed location of one or more fiducial features in the one or more selected images is determined. For example, the corners of the target pattern 112 may be identified, designated, and located within a selected image.

At 710, calibration data associated with the projector is generated based at least in part on the observed location of the one or more fiducial features in the selected image(s).

At 712, calibration matrix metadata 510 is generated based at least in part on the calibration data. For example, the calibration matrix metadata 510 such as described above in FIG. 5 may comprise some of the intrinsic parameters 302, the extrinsic parameters 402, and so forth.

At 714, at least a portion of the calibration matrix metadata 510 is associated with the video stream 104 to generate a video stream with associated calibration matrix 142. This association may include storing the calibration matrix metadata 510 in association with the video stream 104 or actually applying the calibration matrix metadata 510 to the video stream 104. For instance, this association may be made by a time index, counter, byte count, or in some implementations the calibration matrix metadata 510 may be embedded within the video stream itself, such as within MPEG headers.

At 716, calibration data may continue to be generated until a predetermined level of accuracy is reached. That is, calibration data may continue to be generated until the calibration data converges to a pre-determined level of accuracy. For example, calibration to a 0.1 pixel level may be useful, while calibration to 0.01 pixels may be unnecessary in some instances. By continuing to calibrate based on the images in the video stream 104 and using the targets in the plurality of images of the stream, accuracy is improved during use. By calibrating to the pre-determined level of accuracy and suspending calibration until calibration is determined to diverge, computational resources such as processor time are reduced by avoiding additional calibration calculations which provide little or no additional benefit.

At 718, a determination is made as to when the calibration diverges from the pre-determined level of accuracy. For example, when the camera 102 pans or tilts 180 degrees, accuracy of the calibration may not longer be at the pre-determined level of accuracy. As a result, when the calibration diverges from the pre-determined level of accuracy, the process may proceed to 704 and begin again the identification of one or more fiducial features in the plurality of images.

Figure 8:
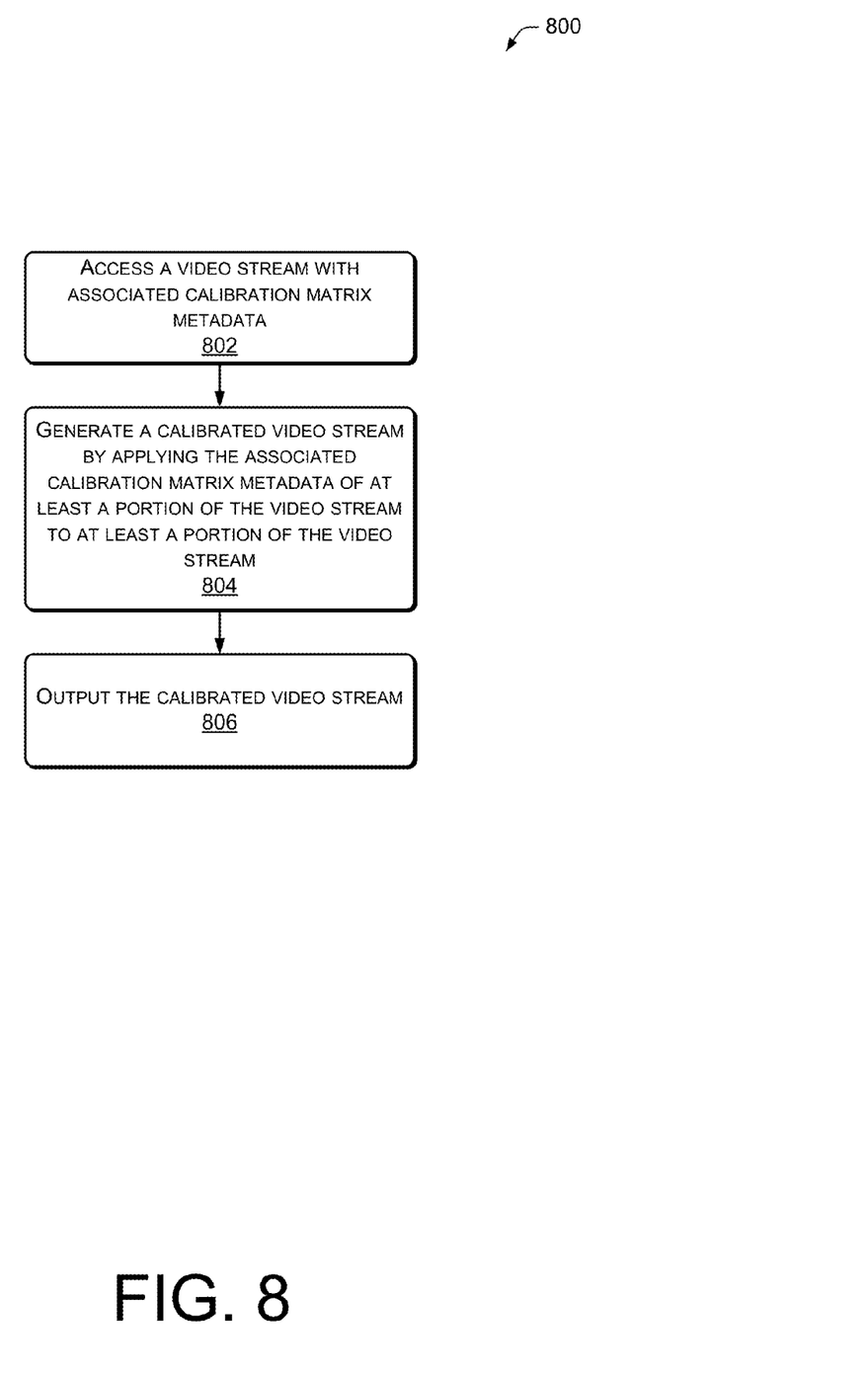
FIG. 8 is a process of generating a calibrated video stream.

FIG. 8 is a process 800 of generating a calibrated video stream. At 802, the video stream with associated calibration matrix metadata 142 is accessed. The video stream may include a first set of images that in which one or more fiducial features are present. Based on the presence of these fiducial features, the first set of images may be associated with calibration matrix metadata, generated as described above with reference to FIG. 7 or otherwise. The second set of images, meanwhile, might not include the fiducial features and, therefore, might not be associated with calibration matrix metadata.

At 804, a calibrated video stream is generated by applying the calibration matrix metadata of the first set of images of the video stream to the second set of images of the video stream. For example, returning to FIG. 6, calibration data was available for the portions of the video stream associated with the acquired image 604(1), (2), and (4). Calibration data from one or more of these portions may be applied to the portion of the video stream associated with 604(3), which may not have calibration data associated therewith due to the absence of targets in the acquired images. By applying the calibration to and, hence, modifying the video stream, distortions or other deviations from the actual scene may be compensated for.

At 806, the calibrated video stream may be output. This calibrated video stream may then be used by other applications, such as for machine vision in an augmented reality system, medical imaging, and so forth. Because the calibrated video stream reflects changes due to the calibration matrix metadata 510, the resulting calibrated video stream may omit the calibration matrix metadata 510.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    a camera configured to acquire video of an environment, wherein:
        the environment includes a first portion that includes a target that presents a fiducial feature and a second portion that does not include the target, the first portion of the environment differing from the second portion of the environment;
        the video comprises a plurality of images, at least one image depicting the target that presents the fiducial feature and at least one other image not depicting the target that presents the fiducial feature; and
    a calibration module coupled to the camera and configured to:
        select, from the plurality of images, images that depict the target that presents the fiducial feature;
        determine, in each of the selected images, an observed location of the fiducial feature depicted in the respective selected image;
        generate calibration data based at least in part on the observed locations of the fiducial feature in the selected images;
        generate calibration matrix metadata based at least in part on the calibration data, the calibration matrix metadata comprising metadata for association with the video; and
        associate at least a portion of the calibration matrix metadata with the video.

2. The system of claim 1, wherein the associating comprises storing the at least a portion of the calibration matrix metadata in association with the video or modifying at least a portion of the video using the calibration matrix metadata.

3. The system of claim 1, wherein the calibration module is further configured to continue generating calibration data until a pre-determined level of accuracy is reached.

4. The system of claim 1, wherein the calibration module is further configured to determine when the calibration data does not satisfy a pre-determined level of accuracy.

5. The system of claim 4, wherein the calibration module is further configured to, upon determining that the calibration data does not satisfy the pre-determined level of accuracy:
    select additional images, from the plurality of images, that depict the target that presents the fiducial feature;
    determine, in each of the selected additional images, an observed location of the fiducial feature in the respective selected additional image; and
    generate calibration data based at least in part on the observed locations of the fiducial feature in the selected additional images.

6. The system of claim 1, further comprising:
    an image projector configured to project the fiducial feature onto the target;
    and wherein the calibration data is for calibrating the image projector.

7. The system of claim 1, wherein the fiducial feature is part of, or affixed to, the target.

8. The system of claim 1, wherein the calibration matrix metadata is based at least in part on at least one of intrinsic parameters, extrinsic parameters, a rolling convergence accuracy value, a date, or a time.

9. The system of claim 1, wherein the calibration matrix metadata is based at least in part on a focal point, a principal point, or both a focal point and a principal point.

10. The system of claim 1, wherein the camera is configured to move from a first position to a second position during at least a portion of acquisition of the video.

11. The system of claim 1, wherein the calibration data is used to adjust or set one or more extrinsic or intrinsic parameters of the camera.

12. One or more non-transitory computer-readable storage media storing instructions that, when executed by one or more processors, cause the one or more processors to perform acts comprising:
    receiving video comprising multiple images that depict a target that presents a fiducial feature, the target residing within a first portion of an environment;
    receiving video comprising multiple images of a second portion of the environment that is different than the first portion, wherein the second portion of the environment does not include the target that presents the fiducial feature;
    identifying the multiple images that depict the target that presents the fiducial feature;
    determining, in each of the multiple images that depict the target that presents the fiducial feature, an observed location of the fiducial feature in the respective image;
    generating calibration data based at least in part on the observed locations of the fiducial feature in the multiple images that depict the fiducial feature;
    generating calibration matrix metadata based at least in part on the calibration data; and
    associating at least a portion of the calibration matrix metadata with the video.

13. The one or more non-transitory computer readable storage of claim 12, wherein the calibration matrix metadata describes a calibration of a camera that acquired the video.

14. The one or more non-transitory computer readable storage of claim 12, wherein the calibration matrix metadata describes a calibration of an image projector that projected the fiducial feature.

15. The one or more non-transitory computer readable storage of claim 12, wherein the multiple images of the video comprise at least one image acquired using a first field-of-view and at least one other image acquired using a second, distinct field-of-view.

16. The one or more non-transitory computer readable storage of claim 12, wherein the calibration matrix metadata comprises one or more intrinsic parameters.

17. The one or more non-transitory computer readable storage of claim 12, wherein the calibration matrix metadata comprises one or more extrinsic parameters.

18. One or more non-transitory computer-readable storage media storing instructions that, when executed by one or more processors, cause the one or more processors to perform acts comprising:
    accessing video comprising a first set of images, wherein each image of the first set of images depicts a target that includes one or more fiducial features, the target residing in a first portion of an environment, the first set of images being associated with calibration matrix metadata;
    accessing video comprising a second set of images of the environment, wherein each image of the second set of images does not depict the target that includes the one or more fiducial features;
    generating calibrated video by applying the calibration matrix metadata of the first set of images to the second set of images; and
    outputting the calibrated video.

19. The one or more non-transitory computer readable storage of claim 18, wherein the calibration matrix metadata is based at least in part on calibration data generated from observed locations of one or more fiducial features in images of the first set of images.

20. The one or more non-transitory computer readable storage of claim 18, wherein the calibration matrix metadata comprises one or more of the following intrinsic parameters:
    a focal point,
    a principal point,
    a skew coefficient, or
    a distortion coefficient.

* * * * *